United States Patent [19]

Baumhöfer

[11] Patent Number: 4,955,418
[45] Date of Patent: Sep. 11, 1990

[54] PNEUMATIC VEHICLE TIRE

[75] Inventor: Johannes J. Baumhöfer, Aachen, Fed. Rep. of Germany

[73] Assignee: Uniroyal Englebert Reifen GmbH, Aachen, Fed. Rep. of Germany

[21] Appl. No.: 321,953

[22] Filed: Mar. 10, 1989

[30] Foreign Application Priority Data

Mar. 12, 1988 [DE] Fed. Rep. of Germany ... 8803348[U]

[51] Int. Cl.$^5$ .............................................. B60C 15/00
[52] U.S. Cl. ........................................ 152/539; 152/544
[58] Field of Search .............. 152/539, 540, DIG. 20, 152/544, 564; 245/1.5

[56] References Cited

U.S. PATENT DOCUMENTS

| | | | |
|---|---|---|---|
| 1,270,053 | 6/1918 | Ream | 245/1.5 |
| 1,614,206 | 1/1927 | Pratt | 245/1.5 |
| 4,088,169 | 5/1978 | Kuroda | 152/540 |
| 4,781,232 | 11/1988 | Klose | 152/540 |

FOREIGN PATENT DOCUMENTS

| | | | |
|---|---|---|---|
| 0995570 | 8/1976 | Canada | 152/540 |
| 0146715 | 7/1985 | European Pat. Off. | 152/539 |
| 55-63907 | 5/1980 | Japan | 152/540 |

Primary Examiner—Michael W. Ball
Assistant Examiner—Gregory J. Wilber
Attorney, Agent, or Firm—Robert W. Becker & Associates

[57] ABSTRACT

A pneumatic vehicle tire having tire beads, each of which is provided with a bead ring that is resistant to pressure and bending and that is in the form of a steel cable including a cable core wire and a plurality of cable sheathing-wires that impart a circular shape to the bead ring, which is able to pivot slightly in the tire bead. Each of the cable wires of the bead ring cable has an outer surface that is in contact with the elastomeric material of the bead or of the carcass, with the bead ring cable being pivotable in the elastomeric material when the latter is vulcanized.

3 Claims, 1 Drawing Sheet

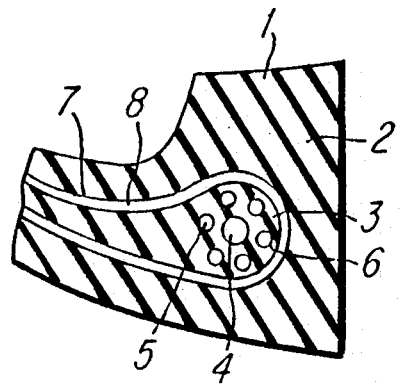

PNEUMATIC VEHICLE TIRE

BACKGROUND OF THE INVENTION

The present invention relates to a pneumatic vehicle tire having tire beads of a rubber mixture or of some other elastomeric material, with each tire bead being provided with a bead ring that is resistant to pressure and bending and that is in the form of a steel cable comprised of a cable core and a plurality of cable sheathing-wires that impart a circular shape to the bead ring cable, which is able to pivot slightly in the elastomeric material of the tire bead.

A pneumatic vehicle tire having a bead core ring of this general type is known from German Offenlegungsschrift No. 33 46 107 Bach et al dated July 14, 1985. This heretofore known bead ring comprises a cable having a steel wire core, and is slightly pivotably disposed in the rubber of the tire bead with the aid of a fabric layer that is disposed on the periphery of the bead ring. It is necessary for the bead ring to be able to pivot slightly during mounting of the tire.

It is desirable to be able to improve the heretofore known tire bead with regard to simplifying the necessary slight pivotability of the bead core ring relative to the tire bead without having to use auxiliary means.

It is therefore an object of the present invention to embody a tire bead of the aforementioned general type with a minimum of elements, and to assure the slight pivotability of the bead core by means of the bead core itself.

BRIEF DESCRIPTION OF THE DRAWING

This object, and other objects and advantages of the present invention, will appear more clearly from the following specification in conjunction with the accompanying drawing, which schematically illustrates one exemplary embodiment of the inventive arrangement.

SUMMARY OF THE INVENTION

The pneumatic vehicle t ire of the present invention is characterized primarily in that the individual cable sheathing-wires of the bead ring cable, which are wound relative to the cable core wire, have an outer surface that is in contact with the vulcanized elastomeric material of the tire bead or of the coating of the carcass.

The cable, as a load-carrying means of the tire bead, is itself slightly torsionally resilient due to its construction with the steel sheathing wires that are twisted about a steel wire core. This resilience is sufficient to slightly rotate the cable, relative to the bead rubber that surrounds the bead ring, without auxiliary means, such as a fabric layer that is wound about the bead ring. As indicated previously, such movements are necessary during the mounting of a tire in order to be able to move the beads over the rim flange to their seating surface on a rim having shoulder seating surfaces on the radially inner periphery thereof.

Absorption of force is effected torsionally resiliently due to the direct positioning of the cable that forms the bead core in the surrounding rubber of the tire bead.

Further specific features of the present invention will be described in detail subsequently.

Description of Preferred Embodiments

Referring now to the drawing in detail, shown is a tire bead 1 that is comprised of the bead rubber 2 and the bead ring 3. The bead ring 3 is a cable that is comprised of a cable core 4 and a plurality of cable sheathing-wires 5, which are preferably wound or twisted relative to the cable core 4. In the illustrated embodiment, six twisted cable wires 5 are provided A carcass 7, which is provided with a rubber coating or rubberizing 8, is anchored on the bead ring 3. The outer surfaces 6 of the cable sheathing-wires 5 are in contact with the vulcanized rubber mixture 2 of the tire bead 1, or preferably with the rubber coating 8 of the carcass 7.

The position of the bead ring 3 is fixed prior to and during vulcanization of the tire. For example, the bead ring is held securely in position relative to the rubber of the bead via an auxiliary means. However, during mounting of the tire, the necessary slight ability of the bead ring to pivot is assured, without any auxiliary means, due to the torsional resilience of the steel cable and due to the slight adhesion of the rubber of the bead to the outer surfaces 6 of the steel wires 5. Consequently, it is possible to embed a bead ring comprised of a cable in the resilient rubber of the bead, without any auxiliary means, and to pivot the bead ring during mounting.

The present invention is, of course, in no way restricted to the specific disclosure of the specification and drawing, but also encompasses any modifications within the scope of the appended claims.

What I claim is:

1. In a pneumatic vehicle tire having tire beads comprising a rubber mixture respectively elastomeric material, with each bead being provided with a bead ring that is resistant to pressure and bending and said bead ring is in the form of a steel cable comprised of a cable core wire and a plurality of cable sheathing-wires that impart a circular shape to said bead ring cable, and said bead ring cable is able to pivot slightly in said bead, and with said tire including a carcass that is anchored in said bead on said bead ring cable and said carcass is provided with a coating of elastomeric material, the improvement wherein:

each of said cable sheathing-wires of said bead ring cable has an outer surface that is in contact with elastomeric material in said tire bead, with each of said cable sheathing-wires of said bead ring cable being pivotable in relation to said elastomeric material when the same is vulcanized so that positioning thereof is fixed prior to and during vulcanization of the tire during mounting of which on a rim consequently a necessary slight ability of the bead ring to pivot is assured due to both torsional resilience of the steel cable and also the elastomeric material in contact with the outer surface of each of said cable sheathing-wires is substantially unbonded to said bead ring cable.

2. A pneumatic vehicle tire according to claim 1, in which said outer surfaces of said cable sheathing-wires are in contact directly with said elastomeric material of said tire bead per se.

3. A pneumatic vehicle tire according to claim 1, in which said outer surfaces of said cable sheathing-wires are in contact only with said elastomeric material of said coating of said carcass per se.